UNITED STATES PATENT OFFICE.

ALBERT W. HAHN, OF NEW YORK, N. Y.

CYANID PROCESS.

1,397,684. Specification of Letters Patent. Patented Nov. 22, 1921.

No Drawing. Application filed December 24, 1919. Serial No. 347,133.

*To all whom it may concern:*

Be it known that I, ALBERT W. HAHN, a citizen of the United States, residing at New York, in the county of New York and State of New York, have invented certain new and useful Improvements in Cyanid Processes, of which the following is a specification.

This invention relates to the recovery of precious metals from cyanid solutions, in which precipitation of the metal is accomplished by the addition of another metal which combines with cyanid, as for instance, zinc. A recognized reaction, dealing with a sodium silver cyanid solution is as follows:

(1) $NaAg(CN)_2 + 2NaCN + Zn + H_2O = Na_2Zn(CN)_4 + Ag + H + NaOH$

It has been thought that the precipitation of the silver from the pregnant solution was due to the action of the zinc dust, *per se*, but it is now believed that the precipitation takes place by reason of the nascent hydrogen liberated, as appears from the equation—

(2) $NaAg(CN)_2 + H_2 + NaOH = Ag + H_2O + 2NaCN + H.$

It will be observed that equation (1) involves free cyanid, and in practice this is always present, and added from time to time.

Now, if we leave out of consideration the sodium silver cyanid compound, the following reaction is true:

(3) $2NaCN + 2H_2O + Zn = 2NaOH + H_2 + Zn(CN)_2$ and as the next step, assuming that free sodium cyanid has been added—

(4) $Zn(CN)_2 + 2NaCN = Na_2Zn(CN)_4$

Apparently, then, it is the liberated nascent hydrogen which causes the precipitation of the silver from the sodium silver cyanid as per equation (1), and this liberation of hydrogen is at the expense of sodium cyanid, which is comparatively a costly chemical. This fact is furthermore proved in practice, because it is found that the amount of zinc dust employed is less than the amount that would be required to satisfy the conditions of equation (1) that a unit of zinc causes the precipitation of an equivalent unit of silver. My invention is accordingly based on the apparent fact that the zinc brings about liberation of hydrogen and it is the liberation of hydrogen which causes precipitation of the silver. The principal object of the invention is to provide for the liberation of hydrogen at the expense of a chemical which is less costly than the free cyanid that is used up under the present practice, and incidentally I contemplate that with the use of this cheaper chemical there shall follow a regeneration of cyanid, for further use in the process. Furthermore, I have it in mind that by the use of this cheaper chemical, hydrolysis of the sodium cyanid into hydrocyanic gas, with consequent loss, is prevented.

I have found that sodium hydroxid has many advantages in this connection, particularly because of its cheapness.

The liberation of hydrogen when sodium hydroxid and zinc dust are brought together takes place as follows:

(5) $Zn + 2NaOH = Na_2ZnO_2 + H_2$

Therefore, I add sodium hydroxid to the standard solution as follows and with these results:

(6) $NaAg(CN)_2 + 3NaOH + Zn + X(NaCN) = Na_2ZnO_2 + Ag + H + (X+2)NaCN + H_2O$ in which X represents the quantity of free sodium cyanid present in the solution under treatment. It will be observed that instead of a loss of sodium cyanid in the reaction, there is a gain (mechanical losses &c. being of course ignored).

The addition of the sodium hydroxid may be made just before the zinc dust is added to the pregnant solution, that is, after the silver is dissolved and the ore pulp is separated from the solution.

I have described my invention in terms of its application to cyanid solution containing silver, and have spoken of particular materials, such as zinc, caustic alkali, &c.; but I wish it to be understood that I intend no limitations except such as follow from the claims.

Wherever I speak of "method" in the claims, I mean the method which involves treating a cyanid solution containing a precious metal, with zinc or equivalent metal which combines with cyanid, to cause precipitation of the precious metal.

I claim:

1. As an improvement in the described method involving the addition of zinc dust to the pregnant solution, the step which comprises adding to the pregnant solution (before the zinc is added and in quantity sufficient to bring about the desired precipitation of precious metal without consuming free cyanid present in the solution), a chemical that will be acted upon by the zinc to liberate hydrogen and precipitate the precious metal.

2. As an improvement in the described method involving the addition of zinc dust to the pregnant solution, the step which comprises adding to the pregnant solution (before the zinc is added and in quantity sufficient to bring about the desired precipitation and to regenerate the cyanid that is combined with the precious metal, without consuming free cyanid already present in the solution), a chemical that will be acted upon by the zinc to liberate hydrogen and precipitate the precious metal.

3. As an improvement in the described method involving the addition of zinc dust to the pregnant solution, the step which comprises adding to the pregnant solution, before the zinc is added, sodium hydroxid in quantity sufficient to bring about the desired precipitation of the precious metal, without consuming free cyanid present in the solution.

In testimony whereof I affix my signature.

ALBERT W. HAHN.